(12) United States Patent
Khullar et al.

(10) Patent No.: US 11,897,997 B2
(45) Date of Patent: Feb. 13, 2024

(54) MODIFIED EPOXY RESIN

(71) Applicant: Aditya Birla Chemicals (Thailand) Ltd. (Epoxy Division), Khet Pathumwan Bankgkok (TH)

(72) Inventors: Alok Khullar, Rayong (TH); Pradip Kumar Dubey, Andheri (east) Mumbai (IN); Thipa Naiyawat, Rayong (TH); Mallika Timngim, Rayong (TH); Dapawan Kunwong, Rayong (TH); Jidapha Onthaworn, Rayong (TH); Daniel Suckley, Rayong (TH); Suphansa Noghan, Rayong (TH)

(73) Assignee: ADITYA BIRLA CHEMICALS (THAILAND) LTD., Bangkok (TH)

( * ) Notice: Subject to any disclaimer, the term of this patent is extended or adjusted under 35 U.S.C. 154(b) by 0 days.

(21) Appl. No.: 17/627,146

(22) PCT Filed: Dec. 12, 2019

(86) PCT No.: PCT/IB2019/060704
§ 371 (c)(1),
(2) Date: Jan. 14, 2022

(87) PCT Pub. No.: WO2021/024033
PCT Pub. Date: Feb. 11, 2021

(65) Prior Publication Data
US 2022/0267512 A1    Aug. 25, 2022

(30) Foreign Application Priority Data
Aug. 8, 2019    (IN) .............................. 2019-11032240

(51) Int. Cl.
*C08G 59/24* (2006.01)
*C08G 59/06* (2006.01)
(Continued)

(52) U.S. Cl.
CPC .......... *C08G 59/24* (2013.01); *C08G 59/066* (2013.01); *C08G 59/08* (2013.01); *C09D 163/00* (2013.01)

(58) Field of Classification Search
None
See application file for complete search history.

(56) References Cited

U.S. PATENT DOCUMENTS 7,682,674 B2    3/2010    Vogt et al.
9,139,690 B2    9/2015    Schmidt
(Continued)

FOREIGN PATENT DOCUMENTS

JP    07165878 A    *    6/1995
WO    2010100122 A1    9/2010
(Continued)

OTHER PUBLICATIONS

Hwang et al., "Low dielectric epoxy resins from dicyclopentadiene-containing poly(phenylene oxide) novolac cured with dicyclopentadiene containing Epoxy," Reactive & Functional Polymers, vol. 68, pp. 1185-1193 (2008) (Year: 2008).*
Hann-Jang Hwang et al, Low Dielectric epoxy resins from cyclopentadiene-containing poly (phenylene oxide) novolac cured with dicyclopentadiene containing epoxy, Reactive & Functional Polymers, 68, pp. 1185-1193, 2008.
(Continued)

*Primary Examiner* — Randy P Gulakowski
*Assistant Examiner* — Ha S Nguyen
(74) *Attorney, Agent, or Firm* — Wood Herron & Evans LLP

(57) ABSTRACT

The present disclosure relates to a modified epoxy resin having the formula (I):

wherein
R is $R_1$, $R_2$ or a combination of $R_1$ and $R_2$;
$R_1$ and $R_2$ are independently alkylene group having 1 to 32 C atoms, branched alkylene group having 1 to 32 C atoms, cyclo-aliphatic group, substituted cycloaliphatic group, aromatic group, substituted aromatic group, biarylene or alkyl substituted biaryl group, cycloaliphatic-aromatic group or arylene-Z-arylene group;
X and Y are independently O, —C(O)O—, or an amine group;
Z is dicyclopentadiene;
R3 and R4 are independently either H, alkyl group, branched alkyl group, alkoxy group, or substituted
(Continued)

biaryl group; R4 and R3 optionally forming a fused aromatic ring or a fused hetero aromatic ring;

n is 0 to 1 wherein concentration of n=0 monomer is greater than 75%; and

N is 1-20.

10 Claims, No Drawings

(51) Int. Cl.
    *C08G 59/08*     (2006.01)
    *C09D 163/00*     (2006.01)
    *C08G 59/50*     (2006.01)
    *C08G 59/62*     (2006.01)

(56) References Cited

U.S. PATENT DOCUMENTS

| | | |
|---|---|---|
| 9,150,685 B2 | 10/2015 | Karl et al. |
| 2003/0170396 A1 | 9/2003 | Yokoi et al. |
| 2004/0087740 A1* | 5/2004 | Ogura .................. C08G 59/502 |
| | | 525/523 |
| 2004/0147638 A1 | 7/2004 | Kim et al. |

FOREIGN PATENT DOCUMENTS

| | | |
|---|---|---|
| WO | 2012091701 A1 | 7/2012 |
| WO | 2016193032 A1 | 12/2016 |

OTHER PUBLICATIONS

PCT Office, International Search Report issued in PCT/IB2019/060704 dated Mar. 19, 2020.

* cited by examiner

MODIFIED EPOXY RESIN

FIELD OF INVENTION

The present disclosure relates to a modified epoxy resin. More particularly, the disclosure relates to a modified epoxy resin useful as bisphenol A non-intent (BPA-NI) epoxy resins.

BACKGROUND

Cured epoxy resins have outstanding mechanical and chemical properties, such as high impact strength, high abrasion resistance, good heat and chemicals resistance, high resistance to alkalis, acids, oils and organic solvents, and high weathering resistance, excellent adhesiveness to a large number of materials, and high electrical insulation capacity. Thus, cured epoxy resins have been widely used in coating compositions, adhesives, insulating materials, casting applications amongst others.

The application of epoxy resins in coating compositions, particularly for metal containers used for packaging and storing of foods and beverages, is relevant. Conventionally, coating compositions comprising a bisphenol A epoxy resin and epichlorohydrin are used for coating inner surface of such metal containers. However, it has been found that bisphenol A gets extracted in the food and adversely affects human-health. It has been found that bisphenol A is an endocrine-disrupting compound acting in the human body in a similar manner as estrogen and may lead to reproduction disorders. Further, epoxy resins manufactured from bisphenol A and epichlorohydrin can result in a coating which contains some residual amount of bisphenol A diglycidyl ether (BADGE). It has been found that BADGE possibly has a carcinogenic effect.

Researchers are therefore working to eliminate bisphenol-A from curable epoxy resin based compositions and prepare Bisphenol-A-Di-Glycidyl-Ether (BADGE) and bisphenol-A (BPA) free resin compositions.

U.S. Pat. No. 7,682,674 discloses BADGE- and BPA-free can coating composition comprising of polyvinylchloride-(PVC)-polymer and acrylic resin.

US20030170396 discloses a BPA free coating composition comprising an epoxy resin having a number average molecular weight of 2,500 to 30,000 and an epoxy equivalent of 1,500 to 20,000 g/equivalent, obtained by reacting a specific low-molecular-weight novolac epoxy resin with a specific low-molecular-weight novolac phenol resin.

US20040147638 describes a 2-layer (core/shell) system, wherein the core is formed from a BPA- or BPF-based epoxy resin, and the outer layer from, for example an acrylate resin. The critical issue here is whether the outer layer is truly able fully to prevent the migration of BPA or bisphenol A diglycidyl ether (BADGE) into the contents.

WO 2010100122 proposes a coating system which is obtainable by reaction of an epoxidized vegetable oil with hydroxyl-functional compounds such as, for example, propylene glycol, propane-1,3-diol, ethylene glycol, NPG, trimethylol propane, diethylene glycol, etc.

WO 2012091701 proposes various diols and their diglycidyl ethers as a substitute for BPA or BADGE for epoxy resins, including derivatives of BPA and ring-hydrogenated BPA, alicyclic diols based on cyclobutane and diols having a furan ring as their parent structure.

U.S. Pat. No. 9,139,690 disclosed a BPA free epoxy resins composition based on diglycidyl ether(s) of substituted cycloaliphatic diol(s).

U.S. Pat. No. 9,150,685 discloses substitute for BPA or BADGE for epoxy resins, including diglycidyl ether of a 2-phenyl-1,3-propanediol, derivatives of substance of structure (IV).

It also mentions oligomer prepared by reacting one or more diols with one or more diglycidyl ethers of a 2-phenyl-1,3-propanediol. The disclosure is limited to use of glycidyl ether based on 2-phenyl-1,3-propanediol or the oligomers of such glycidyl ether with 2-phenyl-1,3-propanediol. However, the patent mentions use of at least one epoxy resin selected from the group consisting of a diglycidyl ether of bisphenol A, a diglycidyl ether of bisphenol F, a diglycidyl ether of a ring-hydrogenated bisphenol A, a diglycidyl ether of a ring-hydrogenated bisphenol F, a cresol epoxy resin, a novolac epoxy resin, and oligomers thereof as one of the resin component.

WO2016193032 discloses tetrahydrofuran diglycol diglycidyl ether derivatives and curable epoxy resin compositions based thereon, as alternatives to the bisphenol A or bisphenol F diglycidyl ethers and to the epoxy resin compositions based thereon.

The coating compositions disclosed in the prior art suffers from limitations such as soft coating, low temperature and low chemical resistance, since the glycidyl ether described in the prior art are based on aliphatic and/or cycloaliphatic diols.

There is thus a need to develop an epoxy resin that exhibits stability, mechanical and thermo-mechanical properties similar to or better than epoxy resins based on BPA, without the health and environmental concerns associated with the use thereof.

SUMMARY

The present disclosure relates to a modified epoxy resin having the formula (I):

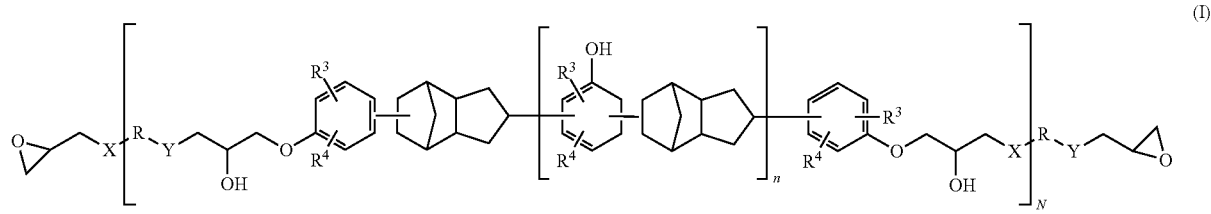

wherein

R is R1, R2 or a combination of R1 and R2;

R1 and R2 are independently alkyl group having 1 to 32 C atoms, branched alkyl group having 1 to 32 C atoms, Cyclo-aliphatic group, substituted cycloaliphatic group, aromatic group, substituted aromatic group, biaryl or alkyl substituted biaryl group, methyl bridged aromatic group, cycloaliphatic-aromatic group or Ar—Z—Ar group;

X and Y are independently 0, —C(O)O—, or an amine group.

Z is dicyclopentadiene;

R3 and R4 are independently either H, alkyl group, branched alkyl group, alkoxy group, substituted biaryl group or methyl bridged aromatic group; R4 and R3 optionally forming a fused aromatic ring or a fused hetero aromatic ring;

n is 0 to 1 with n=0>75%; and

N is 1-20.

A process for preparing above modified epoxy resin is also disclosed. Said process comprises fusing in the presence of an advancement catalyst:

a. dicyclopentadiene-phenolic adduct of formula II:

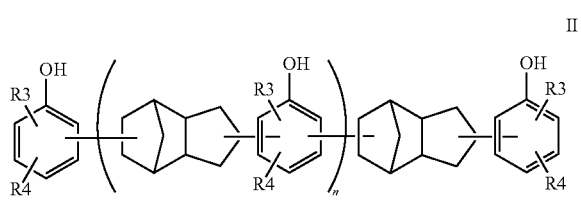

wherein:

R3 and R4 are independently H, alkyl group, branched alkyl group, alkoxy group, substituted biaryl group or methyl bridged aromatic group; R4 and R3 optionally forming a fused aromatic ring or a fused hetero aromatic ring;

n is 0 to 1, with n=0>75%;

b. diglycidyl derivative of formula (III a) or (III b):

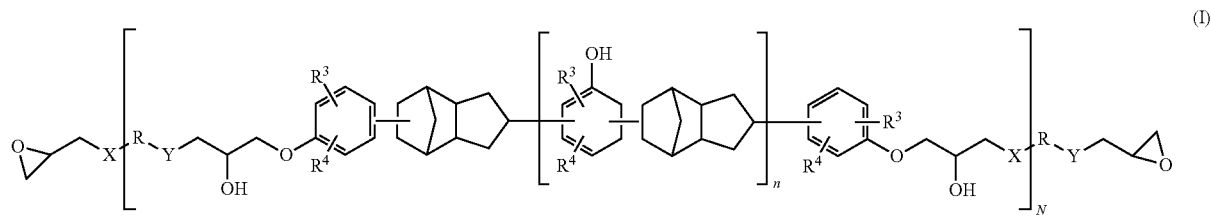

wherein

R1 and R2 are independently alkyl group having 1 to 32 C atoms, branched alkyl group having 1 to 32 C atoms, cyclo-aliphatic group, substituted cycloaliphatic group, aromatic group, substituted aromatic group, biaryl or alkyl substituted biaryl group, methyl bridged aromatic group, cycloaliphatic-aromatic group or Ar—Z—Ar group;

X and Y are independently 0, —C(O)O—, or an amine group.

Z is dicyclopentadiene.

DETAILED DESCRIPTION

For the purpose of promoting an understanding of the principles of the disclosure, reference will now be made to embodiments and specific language will be used to describe the same. It will nevertheless be understood that no limitation of the scope of the disclosure is thereby intended, such alterations and further modifications in the disclosed composition and method, and such further applications of the principles of the disclosure therein being contemplated as would normally occur to one skilled in the art to which the disclosure relates.

It will be understood by those skilled in the art that the foregoing general description and the following detailed description are exemplary and explanatory of the disclosure and are not intended to be restrictive thereof.

Reference throughout this specification to "one embodiment" "an embodiment" or similar language means that a particular feature, structure, or characteristic described in connection with the embodiment is included in at least one embodiment of the present disclosure. Thus, appearances of the phrase "in one embodiment", "in an embodiment" and similar language throughout this specification may, but do not necessarily, all refer to the same embodiment.

In its broadest scope, the present disclosure relates to a modified epoxy resin useful as bisphenol non-intent (BPA-NI) epoxy resin. Particularly, the present disclosure relates to a modified epoxy resin having the formula (I):

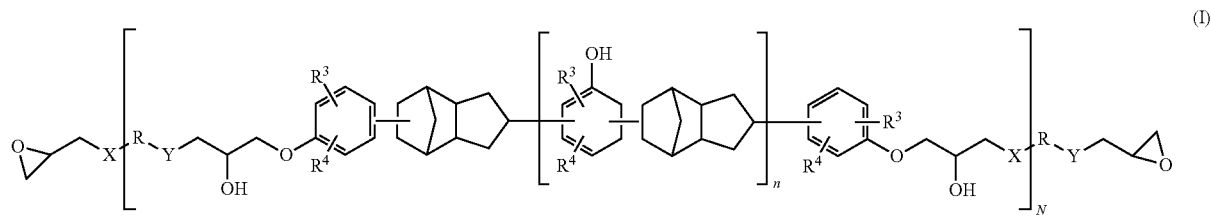

wherein

R is R1, R2 or a combination of R1 and R2;

R1 and R2 are independently alkyl group having 1 to 32 C atoms, branched alkyl group having 1 to 32 C atoms, Cyclo-aliphatic group, substituted cycloaliphatic group, aromatic group, substituted aromatic group, biaryl or alkyl substituted biaryl group, methyl bridged aromatic group, cycloaliphatic-aromatic group or Ar—Z—Ar group;

X and Y are independently 0, —C(O)O—, or an amine group.

Z is dicyclopentadiene;

R3 and R4 are independently either H, alkyl, branched alkyl, alkoxy, substituted biaryl group or methyl bridged aromatic group; R4 and R3 optionally forming a fused aromatic ring or a fused hetero aromatic ring;

n is 0 to 1 with n=0>75%; and

N is 1-20.

In accordance with an aspect, said modified epoxy resin is a reaction product obtained by fusing in the presence of an advancement catalyst:

a. dicyclopentadiene-phenolic adduct of formula II:

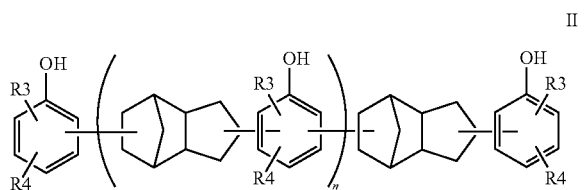

R3 and R4 are independently H, alkyl group, branched alkyl group, alkoxy group, substituted biaryl group or methyl bridged aromatic group; R4 and R3 optionally forming a fused aromatic ring or a fused hetero aromatic ring;

n is 0 to 1, with n=0>75%;

b. diglycidyl derivative of formula (III a) and/or (III b):

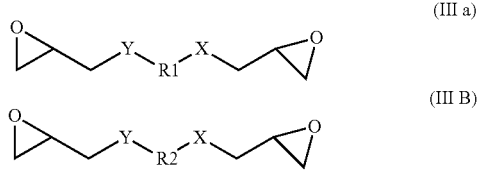

wherein
R1 and R2 are independently alkyl group having 1 to 32 C atoms, branched alkyl group having 1 to 32 C atoms, cyclo-aliphatic group, substituted cycloaliphatic group, aromatic group, substituted aromatic group, biaryl or alkyl substituted biaryl group, methyl bridged aromatic group, cycloaliphatic-aromatic group or Ar—Z—Ar group;
X and Y are independently 0, —C(O)O—, or an amine group.
Z is dicyclopentadiene.

In accordance with an aspect, digylycidyl derivative is either single diglycidyl resin having formula (IIIa) or formula (IIIb), or a mixture of two or more diglycidyl resins, each having formula (IIIa) or (IIIb). In one embodiment, two diglycidyl resins, each having formula (IIIa) is used. In another embodiment, two diglycidyl resins, one having formula (IIIa) and other having formula (IIIb) is used. Depending on selection of diglycidyl derivative having formula (IIIa) and/or (IIIb), R in modified epoxy resin having the formula (I) can be R1, R2 or a combination of R1 and R2.

The disclosed modified epoxy resin produced by advancement of diglycidyl derivatives with dicyclopentadiene-phenolic adduct of high monomeric purity, finds application as alternative to the bisphenol A or bisphenol F diglycidyl ethers.

While in conventional Bisphenol A and Bisphenol F epoxy resins, aromatic rings are considered to be critical for high chemical and corrosion resistance, presently disclosed modified epoxy resin has balanced aromatic component and aliphatic or cycloaliphatic components moieties in oligomeric epoxy resins, without dependence on epoxy resins which are suspected to cause endocrine disruption.

The present method incorporates a typical combination of aromatic content, secondary hydroxyl groups and epoxy functionalities, without any precursor of disclosed resins originating from bisphenol A. The present inventors have controlled the molecular weights of disclosed resins by incorporation of aromatic rings and controlling hydroxyl and epoxide equivalent value of the disclosed epoxy molecules, which is typical of conventional type 7 or type 9 BisA epoxy resins in terms of their chemical composition and performance, through advancement of diglycidyl derivatives of formula (IIIa) or (IIIb) with dicyclopentadiene-phenolic adduct of formula (II), which may otherwise be absent or not sufficiently available in diglycidyl derivatives of formula (IIIa) or (IIIb).

In accordance with an aspect, the modified epoxy resin of the present disclosure has an epoxide equivalent weight (EEW) in a range of 500 to 25000 g/equivalent, and preferably 1000-20000 g/equivalent. Said modified epoxy resin has an average molecular weight in a range of 1000 to 50000 Daltons, and preferably 2000-45000 Daltons. The disclosed BPA-NI type epoxy resins of present disclosure have epoxide equivalent weight and molecular weight comparable to that of standard commercially available, conventional bisphenol A based can coating grades of type 7 and type 9. The disclosed resin find application as coating on metalized surfaces such as can and coil coatings.

A process for preparing a modified epoxy resin is also disclosed. Said process comprises fusing in the presence of an advancement catalyst:

a. dicyclopentadiene-phenolic adduct of formula (II):

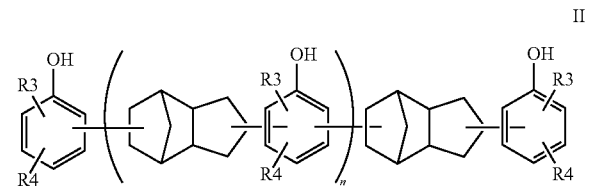

R3 and R4 are independently H, alkyl group, branched alkyl group, alkoxy group, substituted biaryl group or methyl bridged aromatic group; R4 and R3 optionally forming a fused aromatic ring or a fused hetero aromatic ring;

n is 0 to 1, with n=0>75%;

b. diglycidyl derivative of formula (III a) and/or (III b):

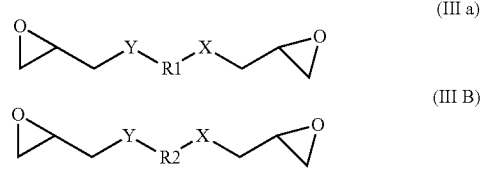

wherein
R1 and R2 are independently alkyl group having 1 to 32 C atoms, branched alkyl group having 1 to 32 C atoms, cyclo-aliphatic group, substituted cycloaliphatic group, aromatic group, substituted aromatic group, biaryl or alkyl substituted biaryl group, methyl bridged aromatic group, cycloaliphatic-aromatic group or Ar—Z—Ar group;
X and Y are independently 0, —C(O)O—, or an amine group.
Z is dicyclopentadiene.

In accordance with an embodiment, dicyclopentadiene-phenolic adduct of formula (II) and diglycidyl derivative of formula (IIIa) and/or (IIIb) are reacted in such quantities which is able achieve target epoxide equivalent weight. Based on active hydrogen equivalent weight of dicyclopentadiene-phenolic adduct of formula (II) ("Component II") and epoxide equivalent weight of diglycidyl derivative of formula (IIIa) and/or (IIIb) ("Component III"), the quantity of reactants can be fixed to achieve preferred epoxide equivalent weight of modified epoxy resin ("I"), using below standard formula known in prior art:

Target EEW (of I) =

$$\frac{\text{Weight of II} + \text{Weight of III}}{(\text{Weight of component III/EEW of coponent III}) - (\text{Weight of II/AHEW of II})}$$

In accordance with an embodiment, said process is carried out at an elevated temperature in a range of 120° C. to 200° C., and preferably in a range of 120° C. to 160° C. In accordance with an embodiment, said process is carried out under atmospheric pressure, with or without nitrogen purging.

In accordance with an embodiment, dicyclopentadiene-phenolic adduct of formula (II) is prepared by diels-alder reaction of phenol or its formaldehyde free derivatives, with 3a,4,7,7a-Tetrahydro-4,7-methanoindene or dicyclopentadiene with high monomeric purity, in the presence of a catalyst. In accordance with an embodiment, dicyclopentadiene-phenolic adduct of formula II has monomeric purity of at least 75% i.e. concentration of n=0 monomer is more than 75%. Preferably, dicyclopentadiene-phenolic adduct of formula II has monomeric purity of at least 75%. This avoids gelation during advancement or fusion reaction.

In accordance with an embodiment, said diglycidyl derivative of formula (IIIa) or (IIIb) are diglycidyl epoxy resins. Said epoxy resins can be diglycidyl ethers or diglycidyl esters. Said diglycidyl ethers and esters are cycloaliphatic, aliphatic or aromatic in nature and is essentially free from any epoxy resin which has endocrine disrupting properties. Said diglycidyl epoxy resins include but are not limited to bisphenol F diglycidyl ether type epoxy resin, a resorcinol diglycidyl ether type epoxy resin, a brominated bisphenol A diglycidyl ether type epoxy resin, a chlorinated bisphenol A diglycidyl ether type epoxy resin, a novolac diglycidyl ether type epoxy resin, an orthocresol novolac diglycidyl ether type epoxy resin, a polyalkylene glycol diglycidyl ether type epoxy resin, a hydrogenated bisphenol A glycidyl ether type epoxy resin, a bisphenol A alkylene oxide-added diglycidyl ether type epoxy resin. Such chemistry without limitation can be extended to other glycidyl ethers like epoxy urethane resin, a glycerine triglycidyl ether type epoxy resin, a pentaerythritol glycidyl ether type epoxy resin and (glycidyl ether phenyl)methane; or diglycidyl ether esters type epoxy resins such as p-oxybenzoic acid glycidyl ether type epoxy resin; or, glycidyl ester type epoxy such as diglycidyl phthalate type epoxy resin, a diglycidyl tetrahydrophthalate type epoxy resin, a diglycidyl hexahydrophthalate type epoxy resin. In accordance with a preferred embodiment, said diglycidyl ethers and esters are aliphatic, cycloaliphatic or aromatic in nature and are essentially free from bisphenol A type diglycidyl ether which are suspected for their endocrine disrupting properties. In accordance with an exemplary embodiment, said diglycidyl derivative of formula (IIIa) or (IIIb) are selected from a group consisting of diglycidyl ethers based on cyclohexane dimethanol, ring alkylated bisphenol-F diglycidyl ether, Dicyclopentadiene diglycidyl ether, aliphatic diglycidyl ethers, such as ethylene glycol diglycidyl ether, polypropylene glycol diglycidyl ether and is preferably cycloaliphatic diglycidyl ether such as CHDMGE, or DCPD-phenol novolac based glycidyl ether.

In accordance with an embodiment, two or more diglycidyl derivatives of formula (IIIa) and (IIIb) having dissimilar R1 and R2 respectively are used. In accordance with an exemplary embodiment, dicyclopentadiene phenol epoxy resin where R1 is dicyclopentadiene phenol adduct and cyclohexanedimethanol diglycidyl ether in which R2 is dicyclohexane dimethanol are used.

In accordance with an embodiment, said diglycidyl derivative of formula (IIIa) or (IIIb) are prepared by reacting epichlorohydrin with aliphatic diol such as butanediol, neopentyl glycol, 1,6 hexanediol etc in the presence of a phase transfer catalyst or by reacting epichlorohydrin with dicyclopentadiene-phenol adduct.

In accordance with an embodiment, advancement of diglycidyl ethers of formula (II) is carried out with dicyclopentadiene-phenolic adduct in the presence of an advancement catalyst. Any known advancement catalyst may be used. In accordance with an embodiment, the catalyst is selected from a group consisting of quaternary phosphonium salts and quaternary ammonium salts. In accordance with a preferred embodiment, the advancement catalyst is a quaternary onium salt catalyst having formula (IV):

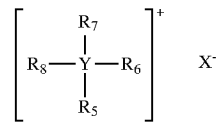

(IV)

wherein:
Y is N or P atom;
X is a halogen or CH2-C(=O)—O—⁻ group;
R5, R6, R7, R8 independent of each other are alkyl, aryl or cycloaliphatic group.

In accordance with an embodiment, said advancement catalyst is employed in a quantity of about 0.2% to 2% w/w of total formulation. The quantity of catalyst can be varied depending on reaction kinetics and heat of reaction, as known to a person skilled in the art.

The present disclosure also relates to a curable epoxy resin composition. Said curable epoxy resin composition comprises a resin component comprising at least 10-50% of said modified epoxy resin composition and a curing agent.

In accordance with an embodiment, said resin component comprises said modified epoxy resin composition in an amount of at least 10 weight % based on the curable epoxy resin composition and preferably at least 25 weight % based on the curable epoxy resin composition.

In accordance with an embodiment, the curing agent is selected from a group consisting of amino curing agent and phenolic curing agent, other than that based on Bisphenol A, Bisphenol F, Bisphenol S and their derivatives. Reaction with curing agents converts polyepoxide compounds into infusible, three-dimensionally "cross-linked", thermoset materials.

Examples of suitable curing agents for the curable epoxy resin composition of the present modified epoxy resin include polyphenols, polycarboxylic acids, polymercaptans, polyamines, primary monoamines, sulfonamides, aminophenol's, amino carboxylic acids, and carboxylic anhydrides, carboxylic acids containing phenolic hydroxyl groups, sulfanilamides, and mixtures thereof. In the context of this disclosure, the respective poly compounds (e.g. polyamine) also include the corresponding di compounds (e.g. diamine).

Preferred curing agents for the present curable epoxy resin composition are amino curing agent and phenolic curing agent.

In accordance with an embodiment, the amino curing agent suitable for curable epoxy resin composition of the present disclosure has at least one primary amino group or two secondary amino groups. Preferred amino curing agent are dicyandiamide (DICY), isophoronediamine (IPDA), diethylenetriamine (DETA), triethylenetetramine (TETA), bis(p-aminocyclohexyl)methane (PACM), methylenedianiline (e.g. 4,4'-methylenedianiline), polyetheramines, e.g. polyetheramine D230, diaminodiphenylmethane (DDM), diaminodiphenylsulfone (DDS), 2,4-toluenediamine, 2,6-toluenediamine, 2,4-diamino-1-methylcyclohexane, 2,6-diamino-1-methylcyclohexane, 2,4-diamino-3,5-diethyltoluene, 2,6-diamino-3,5-diethyltoluene, 1,2-diaminobenzene, 1,3-diaminobenzene, 1,4-diaminobenzene, diaminodiphenyl oxide, 3,3',5,5'-tetramethyl-4,4'-diaminobiphenyl and 3,3'-dimethyl-4,4'-diaminodiphenyl, and also aminoplast resins such as, for example, condensation products of aldehydes such as formaldehyde, acetaldehyde, crotonaldehyde or benzaldehyde with melamine, urea or benzoguanamine, and also mixtures thereof. Particularly preferred amino hardeners for the present curable composition are Dimethyl Dicykan (DMDC), dicyandiamide (DICY), isophoronediamine (IPDA) and methylenedianiline (such as 4,4'-methylenedianiline) and aminoplast resins such as, condensation products of aldehydes such as formaldehyde, acetaldehyde, crotonaldehyde or benzaldehyde with melamine, urea or benzoguanamine.

In accordance with an embodiment, the modified epoxy resin and amino curing agent are used in an approximately stoichiometric ratio in terms of the epoxide and amino functionalities. Particularly suitable ratios of epoxide groups to amino functionality are 1:0.8 to 0.8:1.

In accordance with an embodiment, the phenolic resin suitable for curable epoxy resin composition of the present disclosure has at least two hydroxyl groups. Phenolic resins can be used both in a stoichiometric ratio and in a substoichiometric ratio to the epoxide compounds. When substoichiometric amounts of the phenolic resin are used the reaction of the secondary hydroxyl groups of the existing epoxy resin with epoxide groups is promoted by the use of suitable catalysts. In accordance with an embodiment, suitable phenolic resins are novolacs, phenolic resoles, and condensation products of aldehydes (preferably, formaldehyde and acetaldehyde) with phenols in general. Preferred phenols are phenol, cresol, xylenols, p-phenylphenol, p-tert-butylphenol, p-tert-amylphenol, cyclopentylphenol, and p-nonyl- and p-octylphenol.

In accordance with an embodiment, the curing agent is used in an amount of from about 5 to 25 wt % based on resin component, and preferably about 5 to 15 wt % based on resin component. Ratio of resin to curing agent can vary as per structure and functionality of curing agent. While higher ratio of resin to crosslinker can cause partial curing and poor adhesions after retort test, lower ratio of resin to crosslinker can lead to brittle coating.

In accordance with an embodiment, the curable epoxy resin composition comprises additives selected from a group consisting of accelerators, diluents, lubricants, surfactants, adhesion promoters, stabilizing agents, softening agents, pigments and the like.

In accordance with an embodiment, accelerators are selected from a group consisting of imidazole, imidazole derivatives and urea derivatives.

In accordance with an embodiment, diluents are selected from a group consisting of conventional diluents and reactive diluents. Conventional diluents include organic solvents or mixtures thereof. For example, ketones such as acetone, methyl ethyl ketone, methyl isobutyl ketone (MIBK), diethyl ketone or cyclohexanone, esters of aliphatic carboxylic acids such as ethyl acetate, propyl acetate, methoxypropyl acetate or butyl acetate, glycols such as ethylene glycol, diethylene glycol, triethylene glycol or propylene glycol etc., glycol derivatives such as ethoxyethanol, ethoxyethanol acetate, ethylene or propylene glycol monomethyl or dimethyl ethers, aromatic hydrocarbons such as toluene or xylenes, aliphatic hydrocarbons such as heptane and alkanols such as methanol, ethanol, n- or isopropanol or butanols. In the course of the curing of the epoxy resin, they evaporate from the resin composition.

The present disclosure further relates to a process for curing said curable epoxy resin composition. In accordance with an embodiment, curing takes place under atmospheric pressure and at a temperature less than 250° C., and preferably at a temperature less than 235° C., more preferably at a temperature in a range of 40° C. to 220° C.

In accordance with an embodiment, curing of the curable epoxy resin composition to moldings is carried out in a mold until dimensional stability has been achieved and the cured component can be removed from the mold. The subsequent operation for removing inherent stresses in the cured component and/or for completing the crosslinking of the curable epoxy resin composition is called heat-conditioning. Alternatively, heat-conditioning process is carried out before the cured component is removed from the mold, for the purpose of completing the crosslinking. The heat-conditioning operation typically takes place at temperatures at the limit of dimensional stiffness. Heat-conditioning is carried out at a temperature in a range of 120° C. to 220° C., and preferably at a temperature from 150° C. to 220° C. In accordance with a related embodiment, the cured component is exposed to the heat-conditioning conditions for a time period of 30 to 240 minutes. The time period may be extended depending on the dimensions of the cured component.

In accordance with an embodiment, when the curable epoxy resin composition is used to form coatings, the substrate to be coated is first of all treated with said curable epoxy resin composition, after which the curable epoxy resin composition on the substrate is cured.

In accordance with an embodiment, the treatment of the curable epoxy resin composition is carried out before or after the shaping of the desired article, by dipping, spraying, roller application, spread application, knife coating, or the like, in the case of liquid formulations, or by application of a powder coating material. Application may take place to individual pieces (e.g., can parts) or to fundamentally continuous substrates, such as to strip rolls of steel in the case of coil coating, for example. Suitable substrates are typically those of steel, tinplate (galvanized steel) or aluminum (for beverage cans, for example). Curing of the curable epoxy resin composition following application to the substrate takes place at a temperature in a range from 20° C. to 250° C., preferably from 50° C. to 220° C., more preferably from 100° C. to 220° C. In accordance with a related embodiment, the curing is carried out for a time period of 0.1 to 60 minutes, preferably 0.5 to 20 minutes, more preferably 1 to 10 minutes.

SPECIFIC EMBODIMENTS

A modified epoxy resin having the formula (I):

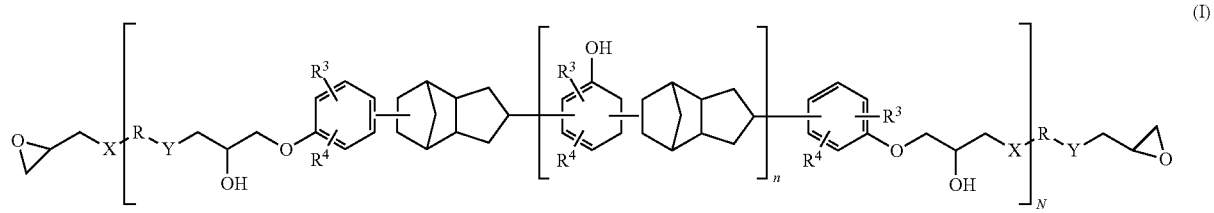

wherein
R is R1, R2 or a combination of R1 and R2;
R1 and R2 are independently alkyl group having 1 to 32 C atoms, branched alkyl group having 1 to 32 C atoms, Cyclo-aliphatic group, substituted cycloaliphatic group, aromatic group, substituted aromatic group, biaryl or alkyl substituted biaryl group, methyl bridged aromatic group, cycloaliphatic-aromatic group or Ar—Z—Ar group;
X and Y are independently 0, —C(O)O—, or an amine group.
Z is dicyclopentadiene;
R3 and R4 are independently either H, alkyl group, branched alkyl group, alkoxy group, substituted biaryl group or methyl bridged aromatic group; R4 and R3 optionally forming a fused aromatic ring or a fused hetero aromatic ring;
n is 0 to 1 with n=0>75%; and
N is 1-20.

Such modified epoxy resin, wherein the modified epoxy resin is a reaction product obtained by fusing in the presence of an advancement catalyst:
a. dicyclopentadiene-phenolic adduct of formula II:

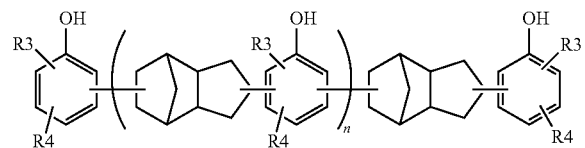

wherein:
R3 and R4 are independently H, alkyl group, branched alkyl group, alkoxy group, substituted biaryl group or methyl bridged aromatic group; R4 and R3 optionally forming a fused aromatic ring or a fused hetero aromatic ring;
n is 0 to 1, with n=0>75%;
b. diglycidyl derivative of formula (III a) or (III b):

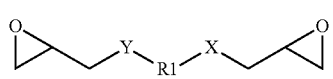

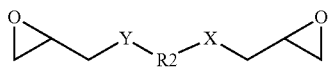

wherein
R1 and R2 are independently alkyl group having 1 to 32 C atoms, branched alkyl group having 1 to 32 C atoms, cyclo-aliphatic group, substituted cycloaliphatic group, aromatic group, substituted aromatic group, biaryl or alkyl substituted biaryl group, methyl bridged aromatic group, cycloaliphatic-aromatic group or Ar—Z—Ar group;
X and Y are independently 0, —C(O)O—, or an amine group.
Z is dicyclopentadiene.

Such modified epoxy resin, wherein the modified epoxy resin has an epoxide equivalent weight in a range 500 to 25000 g/equivalent.

Such modified epoxy resin, wherein the modified epoxy resin has a weight average molecular weight in a range of 1000 to 50000 Daltons.

A curable epoxy resin composition comprising:
10 to 50% of a resin component comprising at least 10 to 50% of said modified epoxy resin composition, based on weight of the curable epoxy resin composition; and
5 to 25% wt/wt of a curing agent based on weight of the resin component.

Such curable epoxy resin composition, wherein the curing agent is selected from a group consisting of amino type curing agent and phenolic type curing agent, and the hardener is non bisphenol.

A process for preparing a modified epoxy resin, the process comprising fusing in the presence of an advancement catalyst:
a. dicyclopentadiene-phenolic adduct of formula II:

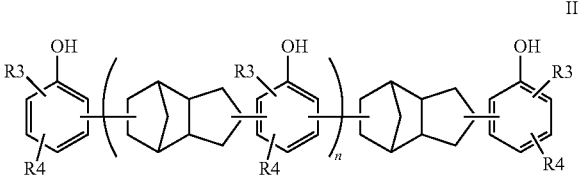

wherein:
R3 and R4 are independently H, alkyl group, branched alkyl group, alkoxy group, substituted biaryl group or methyl bridged aromatic group; R4 and R3 optionally forming a fused aromatic ring or a fused hetero aromatic ring;
n is 0 to 1, with n=0>75%;

b. diglycidyl derivative of formula (III a) or (III b):

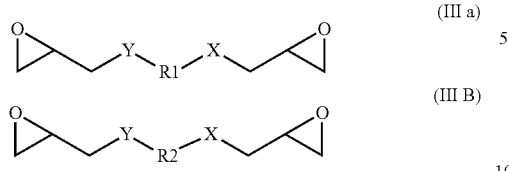

(III a)

(III B)

wherein
R1 and R2 are independently alkyl group having 1 to 32 C atoms, branched alkyl group having 1 to 32 C atoms, cyclo-aliphatic group, substituted cycloaliphatic group, aromatic group, substituted aromatic group, biaryl or alkyl substituted biaryl group, methyl bridged aromatic group, cycloaliphatic-aromatic group or Ar—Z—Ar group;
X and Y are independently 0, —C(O)O—, or an amine group.
Z is dicyclopentadiene;
such that the modified epoxy resin of formula (I) is obtained:

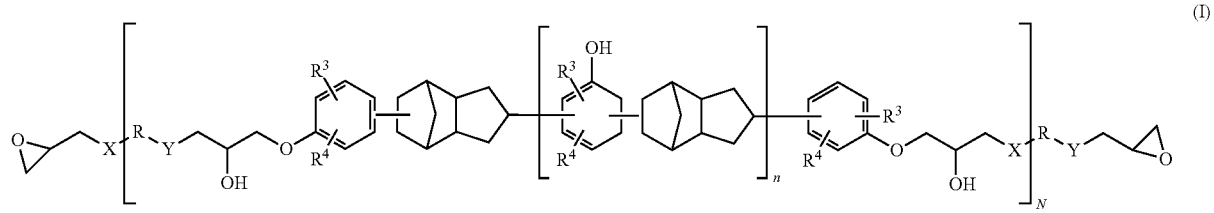

(I)

wherein
R is R1, R2 or a combination of R1 and R2;
R1 and R2 are independently alkyl group having 1 to 32 C atoms, branched alkyl group having 1 to 32 C atoms, Cyclo-aliphatic group, substituted cycloaliphatic group, aromatic group, substituted aromatic group, biaryl or alkyl substituted biaryl group, methyl bridged aromatic group, cycloaliphatic-aromatic group or Ar—Z—Ar group;
X and Y are independently 0, —C(O)O—, or an amine group.
Z is dicyclopentadiene;
R3 and R4 are independently either H, alkyl group, branched alkyl group, alkoxy group, substituted biaryl group or methyl bridged aromatic group; R4 and R3 optionally forming a fused aromatic ring or a fused hetero aromatic ring;
n is 0 to 1 with n=0>75%; and
N is 1-20.

Such process, wherein the dicyclopentadiene-phenolic adduct is prepared by diels-alder reaction of phenol or its formaldehyde free derivatives, with 3a,4,7,7a-Tetrahydro-4, 7-methanoindene or dicyclopentadiene with high monomeric purity, in the presence of a catalyst.

Such process, wherein concentration of n=0 monomer is at least 75%.

Such process, wherein the advancement catalyst is a quaternary onium salt catalyst having formula (IV):

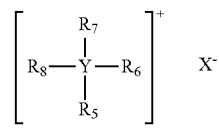

(IV)

wherein:
Y is N or P atom;
X is a halogen or CH2-C(=O)—O⁻ group;
R5, R6, R7, R8 are independently alkyl, aryl or cycloaliphatic group.

EXAMPLES

In order that this invention may be better understood, the following examples are set forth. These examples are for the purpose of illustration only and the exact compositions, methods of preparation and embodiments shown are not limiting of the invention, and any obvious modifications will be apparent to one skilled in the art.

Example 1: Preparation of Dicyclopentadiene-Phenolic Adduct

Into a 2000 ml four-necked flask equipped with stirrer, condenser, thermometer, heater and dropping funnel was charged 1000 grams (10.64 moles) of phenol, 10 grams (1.0 weight % of phenol) of boron trifluoride etherate while temperature was kept at 65° C. Then, 468.8 grams (3.55 moles) of dicyclopentadiene (DCPD) was added drop wise over 3 hours. The temperature was raised and maintained at 100° C. for 5 hours. After the reaction was completed, neutralization was done and unreacted phenol was recovered at 160° C. and 40 mbar.

992 grams of dark brown-colored dicyclopentadiene-phenol resin with softening point of 119.1° C. and 33.2% monomer, was obtained.

Example 2: Preparation of Dicyclopentadiene-Phenolic Adduct

Into a flask as in Example 1 was charged 1000 grams (10.64 moles) of phenol, 5 grams (0.5 weight % of phenol) of boron trifluoride etherate while temperature was kept at 65° C. Then, 234.7 grams (1.78 moles) of DCPD was added drop wise over 2 hours. The temperature was raised and maintained at 100° C. for 5 hours. After the reaction was completed, neutralization was done and the unreacted phenol was recovered at 160° C. and 40 mbar.

528 grams of dark brown-colored dicyclopentadiene-phenol resin with softening point of 93.1° C. and 57.19% monomer, was obtained.

Example 3: Preparation of Dicyclopentadiene-Phenolic Adduct

Into a flask as in Example 1 was charged 1000 grams (6.38 moles) of phenol, 5 grams (0.5 weight % of phenol) of boron trifluoride etherate while temperature was kept at 65° C. Then, 70.3 grams (0.53 moles) of DCPD was added drop wise over 1 hour. The temperature was raised and maintained at 100° C. for 5 hours. After the reaction was completed, neutralization was done and the unreacted phenol was recovered at 160° C. and 40 mbar.

167.9 grams of dark brown-colored dicyclopentadiene-phenol resin with softening point of 79.9° C. and 82.01% monomer, was obtained.

Table 1 shows the properties of dicyclopentadiene-phenolic adduct prepared in Examples 1 to 3.

TABLE 1

| Example | 1 | 2 | 3 |
| --- | --- | --- | --- |
| Mole ratio of Phenol/DCPD | 3 | 6 | 12 |
| Product Specification | | | |
| Yield (%) | 87.3 | 92.8 | 98.6 |
| Appearance | Dark brown solid | Dark brown solid | Dark brown solid |
| Phenol (ppm) | 263 | 312 | <174 |
| S.P. (° C.) | 119.1 | 93.1 | 79.9 |
| Mw | 704 | 730 | 491 |
| Monomer (% on GPC) | 33.21 | 57.19 | 82.01 |

Example 4: Preparation of Epoxidised Dicyclopentadiene Phenol

To a reactor equipped with a stirrer, condenser, thermometer, heater and addition funnel were charged 150 grams (0.94 eq.) of dicyclopentadiene phenol from Example 3, 869.5 grams (9.4 moles) of epichlorohydrin and 2.8 grams of 50% sodium hydroxide. The solution was heated and kept to 65° C. for 4 hours. Subsequently, 70.5 grams of 50% sodium hydroxide was added over a period of 1 hour with simultaneous removal of water.

Unreacted molar excess of epichlorohydrin was removed and toluene was added to dissolve the reaction mass. Washing of reaction mass was done repeatedly to remove residual caustic. Solvent was stripped to obtain the brown solid product.

The product had an epoxy equivalent weight 228 g/eq, hydrolysable chlorine content less than 1000 ppm and softening point 45° C.

Table 2 shows the composition and properties of epoxidised dicyclopentadiene phenol obtained in Example 4.

TABLE 2

| Example | 4 |
| --- | --- |
| 1. Pre-reaction | |
| DCPD-P Adduct | From Example 3 |
| Mole ratio of ECH/OH | 10.0 |
| Mole ratio of NaOH/OH | 0.038 |
| 2. Reaction | |
| Mole ratio of NaOH/OH | 0.940 |

TABLE 2-continued

| Product | Results |
| --- | --- |
| Yield (%) | 99.0 |
| EEW (g/eq) | 228.1 |
| HyCl (%) | 0.0584 |
| Softening point (° C.) | 44.8 |
| Mn | 436 |
| Monomer (% on GPC) | 78.1 |

Example 5: Preparation of Modified Epoxy Resin

Into a 500 ml four-necked flask equipped with stirrer, condenser, thermometer and heater were charged 70.1 grams of epoxidised dicyclopentadiene phenol from Example 4 and 38.2 grams of dicyclopentadiene-phenolic adduct prepared in Example 3. The mixture was agitated and heated under nitrogen to 120° C. Then, 0.08 g ethyl triphenylphosphonium acetate (ETPPAc) was added as advancement catalyst. The reaction temperature was increased to 160° C. and maintained for 9 hours.

The resultant modified epoxy resin had an epoxy equivalent weight 1662 g/eq and softening point 158° C.

Example 6: Preparation of Modified Epoxy Resin

Into the reactor equipped as in Example 5, was charged 165 grams of cyclohexane dimethanol diglycidyl ether (EEW 131.5 g/eq) and 178.8 g of dicyclopentadiene-phenol adduct of Example 3 (AHEW 160). The mixture was agitated and heated under nitrogen to 120° C. Subsequently, 0.9 g ETPPAc was added as advancement catalyst. The reaction temperature was increased to 160° C. and maintained for 7 hours.

The resultant modified epoxy resin had an epoxy equivalent weight 2691 g/eq and softening point 113.6° C.

Example 7: Preparation of Modified Epoxy Resin

To the reactor equipped as in Example 5, were charged 48 grams of cyclohexane dimethanol diglycidyl ether, 12 grams of diglycidyl ether of cyclopentadiene phenol of Example 4, and 59.1 grams of dicyclopentadiene-phenolic adduct from Example 3. The mixture was agitated and heated under nitrogen to 120° C. Then, 0.3 g ETPPAc was added as advancement catalyst. The reaction temperature was increased to 160° C. and maintained for 5.30 hours.

The resultant modified epoxy resin had an epoxy equivalent weight 2716 g/eq and softening point 120.7° C.

Example 8: Preparation of Modified Epoxy Resin

To the reactor equipped as in Example 5, were charged 60 grams of biphenol diglycidyl ether (EEW 187.6 g/eq) and 41.6 grams of dicyclopentadiene-phenolic adduct from Example 3. The mixture was agitated and heated under nitrogen to 120° C. Then, 0.15 grams ETPPAc was added as advancement catalyst. The reaction temperature was increased to 160° C. and maintained for 7 hours.

The resultant modified epoxy resin had an epoxy equivalent weight 2511 g/eq and softening point 142.7° C.

Table 3 shows the composition and properties of modified epoxy resin obtained in Example 4.

TABLE 3

| Example | 5 | 6 | 7 | 8 |
|---|---|---|---|---|
| Raw materials | | | | |
| Epoxy resin | Epoxidised DCPD · Phenol (Example 4) | Cyclohexane dimethanol Diglycidyl ether | Cyclohexane dimethanol Diglycidyl ether/ Epoxidised DCPD · Phenol (Example 4) (80/20) | Biphenol Diglycidyl ether |
| Chain extender | DCPD · Phenol adduct (Example 3) | DCPD · Phenol adduct (Example 3 | DCPD · Phenol adduct (Example 3 | DCPD · Phenol adduct (Example 3 |
| Product | Results | | | |
| State | Solid | Solid | Solid | Solid |
| EEW (g/eq) | 1,662 | 2,691 | 2,716 | 2,512 |
| Softening point (° C.) | 158 | 113.6 | 120.7 | 142.7 |
| Mn | 2,590 | 3,282 | 3,426 | 2,504 |

Example 9

To a reactor equipped as in Example 6, were charged 57 grams of diglycidyl ether of cyclohexane di-methanol (EEW 159 g/eq) and 50.5 grams of dicyclopentadiene-phenolic adduct of Example 3. The reactor was heated to 90° C. and followed by addition of 0.25 grams of ETPPAc. The reaction mixture was heated to and maintained at 160° C. for 7 hours.

At the end of reaction, a brown reaction product was obtained with EEW 2358 g/eq and softening point 92.4° C.

Example 10

To the reactor equipped as in Example 5, were charged 167.5 grams of diglycidyl ether of cyclohexane di-methanol (EEW 137.8 g/eq) and 173.5 grams of dicyclopentadiene-phenolic adduct from Example 3. The mixture was agitated and heated under nitrogen to 120° C. Then, 0.9 g ETPPAc was added as advancement catalyst. The reaction temperature was increased to 160° C. and maintained for 5 hours.

The resultant modified resin had an epoxy equivalent weight 2889 g/eq and softening point 110.4° C.

Impact of quality of diglycidyl epoxy resin (EEW) on quality of modified epoxy resin was studied by comparing the properties of reaction product obtained in Example 6, 9 and 10, as illustrated in Table 4.

TABLE 4

| Example | 6 | 9 | 10 |
|---|---|---|---|
| Raw material | | | |
| Target EEW (g/eq) | 2,500 | 2,500 | 2,600 |
| Epoxy resin | diglycidyl ether of cyclohexane di-methanol (EEW 131 g/eq) | diglycidyl ether of cyclohexane di-methanol (EEW 159 g/eq) | diglycidyl ether of cyclohexane di-methanol (EEW 137.8 g/eq) |
| Chain extender | DCPD Phenol adduct (from Example 3) | DCPD Phenol adduct (from Example 3) | DCPD Phenol adduct (from Example 3) |
| Product | | | |
| State | Solid | Solid | Solid |
| EEW (g/eq) | 2,691 | 2,358 | 2,889 |
| Softening point (° C.) | 113.6 | 92.4 | 110.4 |

TABLE 4-continued

| Example | 6 | 9 | 10 |
|---|---|---|---|
| Mn (Number Molecular weight) | 3,282 | 2,272 | 2,766 |

Observation: It was observed that higher the purity of Diglycidyl ether, higher was the softening point of modified epoxy resin.

Example 11: Preparation of Coating Compositions Based on Modified Epoxy Resins A coating composition was prepared using the modified epoxy resin of Example 6. The ingredients of the coating compositions for coating on metal surfaces and their properties, are listed in Table 5.

TABLE 5

| Composition No | | A | B |
|---|---|---|---|
| Resin | Example | 6 | 6 |
| | EEW (g/eq) | 2,691 | 2,691 |
| Formulation | Resin/croslinker rstio | 95:5 | 90:10 |
| Resin | Resin solution (g) | 73.89 | 70 |
| crosslinker | Cymel (g) | Cymel 659 2.43 | Cymel 559 4.86 |
| Catalyst | Cycat600(0.85% base on total formulation) (g) | 0.65 | 0.64 |
| Solvent | Solvent | 23.03 | 24.5 |
| Testing | MEK DR (times) | 40 | 50 |
| | Adhesion, cross cut(% remove) | 0, 0, 0 | 0, 0, 0, |
| | wedge bend(%) (2 min) retort:adhesion (% remove) | 84, 88 | 89, 90 |
| | DI water | 0, 0 | 0, 0 |
| | NaOH pH10 | 0, 0 | 20, 25 |
| | citric acid 1% | 50, 50 | 50, 50 |

INDUSTRIAL APPLICABILITY

The modified epoxy resin of present disclosure are safe to use non-endocrine disrupting type bi-functional epoxy resins and finds application as Bisphenol Non-intent (BPA-NI) and Formaldehyde free epoxy resin. It has a reduced potential to release endocrine disrupting compounds compared to epoxy resins based on bisphenol A, bisphenol F, bisphenol S or any such molecule which is a proven endocrine disruptor.

Dicyclopentadiene-phenolic adducts of formula (II) neither have structural similarity with estradiol, an endocrine disrupting hormone, nor they involve use of formaldehyde. Such structural similarity with estradiol is considered to be critical factor in current decision of European agencies to phase out suspected endocrine disruptors like bisphenol A and F from use in certain container coatings.

A range of existing cycloaliphatic, aliphatic, bi-aryl phenolic glycidyl ether of general formula (II) can be advanced with dicyclopentadiene-phenolic adduct of formula (II), to obtain modified epoxy resins of the present disclosure.

The disclosed modified epoxy resins exhibit performance similar to conventional can-coating grade epoxy resin i.e type 7 and type 9 BPA based resin, but without the health and environmental concerns of the latter.

Said modified epoxy resin exhibit good adhesion, excellent corrosion resistance, excellent retort resistance and impact resistance properties and can be used in varnishes and coatings for metal surfaces, without any further modifications with silane derivatives as mentioned otherwise in prior art. Particularly, the curable epoxy resin composition comprising modified epoxy resin of present disclosure find application in adhesives, composite materials, moldings, and coatings, and more particularly in coatings for containers for food and beverage.

We claim:

1. A modified epoxy resin having the formula (I):

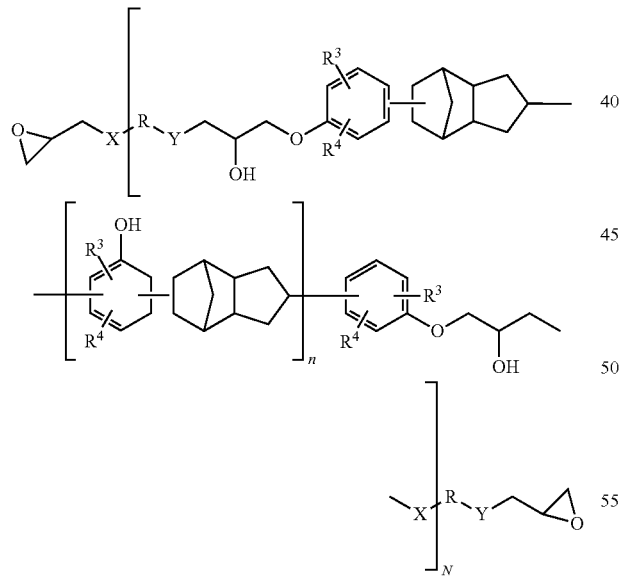

(I)

wherein
R is R1, R2 or a combination of R1 and R2;
R1 and R2 are independently alkylene group having 1 to 32 C atoms, branched alkylene group having 1 to 32 C atoms, cycloaliphatic group, substituted cycloaliphatic group, aromatic group, substituted aromatic group, biarylene or alkyl substituted biarylene group, cycloaliphatic-aromatic group or arylene-Z-arylene group;

X and Y are independently 0, —C(O)O—, or an amine group;
Z is dicyclopentadiene;
R3 and R4 are independently either H, alkyl group, branched alkyl group, alkoxy group, or substituted biaryl group; R4 and R3 optionally forming a fused aromatic ring or a fused hetero aromatic ring;
n is 0 to 1 wherein concentration of n=0 monomer is greater than 75%; and
N is 1-20.

2. The modified epoxy resin as claimed in claim 1, wherein the modified epoxy resin is a reaction product obtained by fusing in the presence of an advancement catalyst:
a. dicyclopentadiene-phenolic adduct having the formula (II):

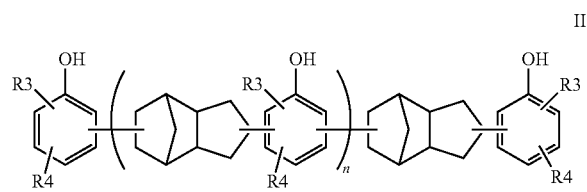

II wherein:
R3 and R4 are independently H, alkyl group, branched alkyl group, alkoxy group, or substituted biaryl group; R4 and R3 optionally forming a fused aromatic ring or a fused hetero aromatic ring;
n is 0 to 1, wherein concentration of n=0 monomer is greater than 75%;
b. diglycidyl derivative having the formula (III a) or (III b):

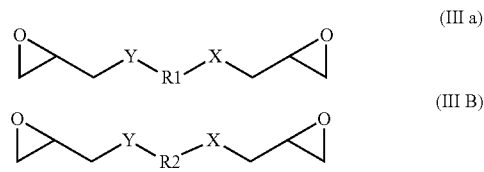

(III a)

(III B)

wherein
R1 and R2 are independently alkyl group having 1 to 32 C atoms, branched alkyl group having 1 to 32 C atoms, cyclo-aliphatic group, substituted cycloaliphatic group, aromatic group, substituted aromatic group, biarylene or alkyl substituted biarylene group, cycloaliphatic-aromatic group or arylene-Z-arylene group;
X and Y are independently 0, —C(O)O—, or an amine group;
Z is dicyclopentadiene.

3. The modified epoxy resin as claimed in claim 1, wherein the modified epoxy resin has an epoxide equivalent weight in a range 500 to 25000 g/equivalent.

4. The modified epoxy resin as claimed in claim 1, wherein the modified epoxy resin has a weight average molecular weight in a range of 1000 to 50000 Daltons.

5. A curable epoxy resin composition comprising:
10 to 50 wt. % of a resin component comprising at least 10 to 50 wt. % of the modified epoxy resin as claimed in claim 1, based on weight of the curable epoxy resin composition; and 5 to 25 wt. % of a curing agent based on weight of the resin component.

6. The curable epoxy resin composition as claimed in claim 5, wherein the curing agent is selected from a group consisting of amino type curing agent and phenolic type curing agent, and the curing agent is not based on bisphenol.

7. A process for preparing a modified epoxy resin, the process comprising fusing in the presence of an advancement catalyst:
   a. dicyclopentadiene-phenolic adduct having the formula II:

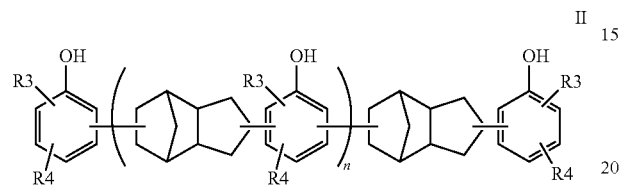

wherein:
   R3 and R4 are independently H, alkyl group, branched alkyl group, alkoxy group, or substituted biaryl group; R4 and R3 optionally forming a fused aromatic ring or a fused hetero aromatic ring;

n is 0 to 1, wherein concentration of n=0 monomer is greater than 75%;
   b. diglycidyl derivative having the formula (III a) or (III b):

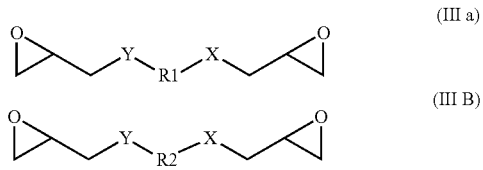

wherein
   R1 and R2 are independently alkyl group having 1 to 32 C atoms, branched alkyl group having 1 to 32 C atoms, cyclo-aliphatic group, substituted cycloaliphatic group, aromatic group, substituted aromatic group, biarylene or alkyl substituted biarylene group, cycloaliphatic-aromatic group or aryl ene-Z-aryl ene group;
   X and Y are independently 0, —C(O)O—, or an amine group;
   Z is dicyclopentadiene;
   such that the modified epoxy resin of formula (I) is obtained:

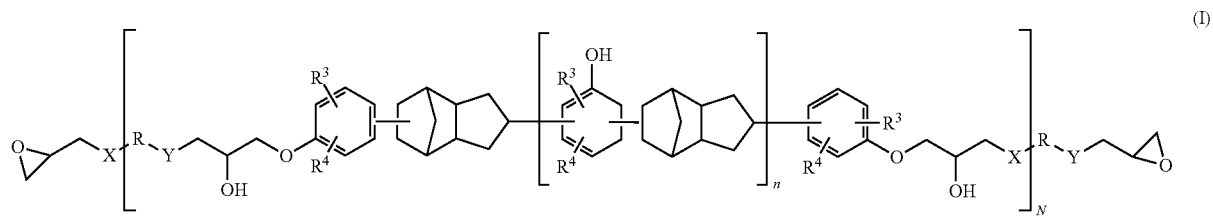

wherein
   R is R1, R2 or a combination of R1 and R2;
   R1 and R2 are independently alkylene group having 1 to 32 C atoms, branched alkylene group having 1 to 32 C atoms, cyclo-aliphatic group, substituted cycloaliphatic group, aromatic group, substituted aromatic group, biarylene or alkyl substituted biarylene group, cycloaliphatic-aromatic group or arylene-Z-arylene group;
   X and Y are independently 0, —C(O)O—, or an amine group;
   Z is dicyclopentadiene;
   R3 and R4 are independently either H, alkylene group, branched alkylene group, alkoxy group, substituted biarylene group or; R4 and R3 optionally forming a fused aromatic ring or a fused hetero aromatic ring;
   n is 0 to 1 with wherein concentration of n=0 monomer is greater than 75%; and
   N is 1-20.

8. The process as claimed in claim 7, wherein the dicyclopentadiene-phenolic adduct having the formula II is prepared by diels-alder reaction of phenol or its formaldehyde free derivatives, with 3a,4,7,7a-Tetrahydro-4,7-methanoindene or dicyclopentadiene with high monomeric purity, in the presence of a catalyst.

9. The process as claimed in claim 7, wherein the advancement catalyst is a quaternary onium salt catalyst having formula (IV):

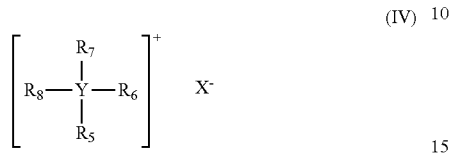

(IV)

wherein:
Y is N or P atom;
X is a halogen or CH2-C(=O)—O—⁻ group;
R5, R6, R7, R8 are independently alkyl, aryl or cycloaliphatic group.

10. The process as claimed in claim 7, wherein said catalyst is employed in a quantity of from about 0.2% to 2% w/w based on total formulation.

* * * * *